(12) United States Patent
Baur (10) Patent No.: US 12,117,557 B2
(45) Date of Patent: Oct. 15, 2024

(54) WAVEGUIDE COUPLING DEVICE FOR A RADAR SENSOR

(71) Applicant: VEGA Grieshaber KG, Wolfach (DE)

(72) Inventor: Roland Baur, Koenigsfeld (DE)

(73) Assignee: VEGA Grieshaber KG, Wolfach (DE)

( * ) Notice: Subject to any disclaimer, the term of this patent is extended or adjusted under 35 U.S.C. 154(b) by 466 days.

(21) Appl. No.: 17/398,676

(22) Filed: Aug. 10, 2021

(65) Prior Publication Data
US 2022/0050170 A1 Feb. 17, 2022

(30) Foreign Application Priority Data

Aug. 12, 2020 (EP) .................................. 20190652

(51) Int. Cl.
*G01S 7/03* (2006.01)
*H01Q 13/00* (2006.01)

(52) U.S. Cl.
CPC ............. *G01S 7/032* (2013.01); *H01Q 13/00* (2013.01)

(58) Field of Classification Search
CPC ................................ G01S 7/032; H01Q 13/00
See application file for complete search history.

(56) References Cited

U.S. PATENT DOCUMENTS

| | | | |
|---|---|---|---|
| 3,732,508 A | 5/1973 | Ito et al. | |
| 10,283,832 B1* | 5/2019 | Chayat | H01P 1/2084 |
| 2003/0141940 A1* | 7/2003 | Le Bihan | H01P 5/107 333/26 |
| 2008/0030284 A1* | 2/2008 | Tanaka | H01P 1/2005 333/33 |
| 2008/0116883 A1* | 5/2008 | Ruehl | G01D 5/2093 324/207.17 |
| 2016/0204495 A1 | 7/2016 | Takeda et al. | |

FOREIGN PATENT DOCUMENTS

| | | | | |
|---|---|---|---|---|
| CN | 110739513 A | 1/2020 | | |
| DE | 2162196 A1 | 7/1972 | | |
| DE | 102006032346 A1 * | 1/2008 | ........... | G01F 23/284 |

(Continued)

OTHER PUBLICATIONS

Wael Abdulla Ahmad et al.; "Millimeter-Wave Single-Layer Full-Band WR12 Vertical Waveguide Transition"; Institute of Electronic Devices and Circuits, Ulm University, 89081 Ulm, Germany; 978-1-7281-1120-9/20 2020 IEEE, 4 pages.

(Continued)

*Primary Examiner* — Vladimir Magloire
*Assistant Examiner* — Maxine McKenzie Phillips
(74) *Attorney, Agent, or Firm* — Sterne, Kessler, Goldstein & Fox P.L.L.C.

(57) ABSTRACT

A waveguide coupling device for a radar sensor is provided. The waveguide coupling device may include a waveguide for radiating and/or receiving a radar signal and a high frequency substrate. The high frequency substrate may include at least one input waveguide for injecting at least one excitation wave into the high frequency substrate, a radiating region for coupling the excitation wave out of the high frequency substrate, and an optionally substrate-integrated waveguide coupled to the input waveguide and the radiating region. The waveguide may have an excitation end arranged on its radiation region.

20 Claims, 4 Drawing Sheets

(56) References Cited

FOREIGN PATENT DOCUMENTS

| DE | 102013108434 A1 | | 2/2015 | |
|---|---|---|---|---|
| DE | 102015218877 A1 | * | 3/2017 | ............ H01P 1/2133 |
| DE | 2020200882 A1 | | 10/2020 | |
| DE | 102019204671 A1 | | 10/2020 | |
| EP | 2652462 B1 | * | 8/2016 | ............. G01F 23/24 |
| EP | 3839453 A1 | * | 6/2021 | ............ G01J 3/0205 |
| FR | 3024802 A1 | * | 2/2016 | ............. G01S 13/44 |
| GB | 2240628 A | * | 8/1991 | ............. G01R 33/62 |
| WO | WO-2020025690 A1 | * | 2/2020 | ........... G01F 23/284 |

OTHER PUBLICATIONS

Teng Li et al.; A wideband right-angle transition between thin substrate integrated waveguide and rectangular waveguide based on multi-section structure; International Journal of Microwave and Wireless Technologies, 2016, 8 (2), pp. 185-191; Cambridge University Press and the European Microwave Association, 2015; doi: 10.1017/S1759078715000185.

* cited by examiner

WAVEGUIDE COUPLING DEVICE FOR A RADAR SENSOR

CROSS-REFERENCE TO RELATED APPLICATIONS

This application claims the benefit of the filing date of European Patent Application No. 20 190 652.6 filed on Aug. 12, 2020, the entire content of which is incorporated herein by reference.

FIELD

The invention relates generally to the field of radar technology and/or radar measurement technology. In particular, the invention relates to a waveguide coupling device for a radar sensor, a radar sensor comprising such a waveguide coupling device, a level meter comprising such a waveguide coupling device, the use of such a waveguide coupling device, and a method of generating a radar signal using such a waveguide coupling device.

BACKGROUND

Radar measuring devices or radar sensors can be used, among other things, in automation technology in the industrial environment. For example, they can be designed in the form of radar level meters for determining the level of a medium. Often, such radar level measuring devices (hereinafter also referred to as level measuring devices) have an antenna, such as a horn antenna, which can be fed with a radar signal via a waveguide and via which the radar signal can be emitted and a part of the radar signal reflected on a surface can be received.

A radar signal or an electromagnetic wave underlying the radar signal, such as a microwave, can be generated by a radar module with a radar signal source and coupled into the waveguide via a substrate-integrated waveguide, for example, from which the radar signal can be radiated. An injection from the substrate-integrated waveguide into the waveguide can be performed, for example, via a patch antenna with a resonant pot or via a lambda/4 plate with a resonant pot. However, such waveguide couplings (or waveguide coupling devices) can be cost-intensive to manufacture, for example because the resonant pot is regularly incorporated into a printed circuit board.

BRIEF SUMMARY

Embodiments of the present invention can advantageously provide an improved waveguide coupling device for a radar sensor, as well as a corresponding radar sensor and level measurement device.

This is achieved in particular by the subject matter of the independent claims. Further embodiments are provided in the dependent claims and the following description.

The following description applies equally to the waveguide coupling device, the radar sensor, the use of the waveguide coupling device and/or the radar sensor, the method for generating a radar signal with the waveguide coupling device, and the level measuring device with the radar sensor and/or the waveguide coupling device. In other words, features, elements and/or functions described below with reference to the waveguide coupling device apply equally to the radar sensor, the use of the waveguide coupling device, the method for generating a radar signal with the waveguide coupling device, and the level measuring device, and vice versa.

A first aspect of the present disclosure relates to a waveguide coupling device for a radar sensor. The waveguide coupling device comprises a waveguide for radiating and/or emitting a radar signal and a high frequency substrate. The high-frequency substrate has, at a first end, at least one input conductor for injecting at least one excitation wave into the high-frequency substrate, a radiating region for coupling the excitation wave out of the high-frequency substrate at a second end opposite the first end, and a waveguide coupled to the input conductor and the radiating region. One end of the waveguide, referred to as hereinafter as the excitation end of the waveguide, is disposed at, adjacent to, and/or on the radiation region of the high-frequency substrate such that the excitation wave can be coupled into, coupled into, and/or immersed in the excitation end of the waveguide via the radiation region of the high-frequency substrate. The waveguide further comprises at least a first excitation element and a second excitation element, each of which is disposed at the excitation end in an internal volume of the waveguide. The first excitation element has a first length dimensioned in the longitudinal direction of the waveguide, and the second excitation element has a second length dimensioned in the longitudinal direction of the waveguide, which is different from the first length of the first excitation element, such that via, based on and/or by the excitation wave at the first excitation element and the second excitation element at least a first resonance wave with a first resonance frequency and a second resonance wave with a second resonance frequency are excitable, which are at least partially superimposable, interferable, and/or interfering in the waveguide forming the radar signal.

The excitation wave may generally be an electromagnetic wave, such as a microwave, which may be provided by a radar module, for example. The high-frequency substrate may be arranged to propagate and/or guide the excitation wave along a direction of travel of the excitation wave and to at least partially couple into the waveguide and, if applicable, to couple the received signal from the waveguide into the substrate in the case of reception. The first end of the high-frequency substrate may be located opposite the second end in the direction of travel of the excitation wave and/or upstream of the second end of the high-frequency substrate. The high frequency substrate may, for example, be in the form of a printed circuit board (PCB) and/or a printed circuit board.

The input conductor, which is located at the first end of the high-frequency substrate, may be a line, a microstrip line, and/or a strip line. Via the input conductor, the excitation wave can be fed into the high-frequency substrate, for example, from a source, for example, a microwave source, a radar module, a radar signal source, or the like, and guided in the direction of the radiation area via the waveguide, or alternatively via a stripline, coplanar line, microstrip, or the like.

The waveguide may be, for example, a substrate integrated waveguide (SIW). The waveguide can be regarded as a filled waveguide. For example, this may have a planar top side and a planar bottom side, for example, in the form of copper layers and/or conductive layers, between which there is substrate material and which may be electrically conductively connected to one another by means of vias or vias forming the "side walls" of the "waveguide". Alternatively, however, any other type of waveguide may be used.

The radiating region may be a section of the high-frequency substrate over which at least a portion of the excitation wave can be coupled into the excitation end of the waveguide.

It should be noted that analogous to transmitting and/or radiating the radar signal, a radar signal reflected from a surface can also be received with the waveguide coupling device. All of the foregoing and subsequent disclosures with respect to radiating and/or transmitting the radar signal therefore apply analogously to receiving a radar signal with the waveguide coupling device.

The waveguide can basically have any geometry and/or cross-sectional geometry. For example, the waveguide can be a round waveguide, an elliptical waveguide, an oval waveguide, or a rectangular waveguide. The excitation end of the waveguide may designate an end of the waveguide facing the radiation region of the high-frequency substrate, which may be opposite a radiation end of the waveguide in the radiation direction of the radar signal and/or in the longitudinal extension direction of the waveguide. The longitudinal extension direction of the waveguide may be substantially parallel to a radiation direction and/or a propagation direction (or running direction) of the radar signal inside the waveguide. The waveguide can be used to couple and radiate the radar signal, for example, into an antenna, such as of a radar sensor and/or a level meter. The waveguide can, for example, be made of metal and/or an electrically conductive material.

In the context of the present disclosure, an "excitation element" may refer to a geometric structure configured to form and/or generate one or more resonant waves in the interior volume of the waveguide. In this regard, a resonant wave may be generated by, at and/or in one of the excitation elements. Alternatively or additionally, a resonance wave may be generated between two excitation elements and/or between one of the excitation elements and another structure of the waveguide. Each resonance wave may denote an electromagnetic wave generated by one or more (or based on one or more) excitation elements and having a defined resonance frequency. The resonance frequencies of different resonance waves can differ from each other.

The lengths of the excitation elements may generally denote a dimension of the respective excitation element, which may be dimensioned parallel to the longitudinal extension direction of the waveguide and/or parallel to the radiation direction of the radar signal. For example, the length of each exciter element may be dimensioned from a lower edge of the respective exciter element to an upper edge of the respective exciter element opposite the lower edge in the longitudinal extension direction of the waveguide. The lower edges of several excitation elements can be arranged at different or identical distances from an end face of the waveguide at the excitation end. In particular, it can be provided that the lower edges of at least some of the excitation elements are flush with the end face of the waveguide at the excitation end. However, it is also conceivable that at least some of the excitation elements are offset relative to one another in the longitudinal direction.

The lengths of the excitation elements can be selected in such a way that the upper edges of different excitation elements are spaced at different distances from the end face of the waveguide at the excitation end compared to each other. In particular, the lengths of the excitation elements can be selected and matched to each other in such a way that at least two resonant waves with two different resonant frequencies can be generated or excited in the waveguide. In particular, the first length of the first excitation element and the second length of the second excitation element can be selected and/or matched in relation to each other such that the first resonant wave can be generated at the first resonant frequency and the second resonant wave can be generated at the second resonant frequency. The first and second resonant waves can, for example, interfere in the waveguide and at least partially form the radar signal.

In principle, each of the excitation elements can have any geometry, shape, size, cross-sectional geometry, or the like. For example, one or more of the exciter elements can be plate-shaped, pin-shaped, fin-shaped, and/or cuboid-shaped, at least in a partial area. However, other geometries are also conceivable. Furthermore, different excitation elements may have similar or identical geometries and/or cross-sectional geometries. Alternatively, different excitation elements may have different geometries and/or cross-sectional geometries compared to each other.

The waveguide coupling device according to embodiments can advantageously enable a broadband feed of an excitation wave into the waveguide and/or the generation of a broadband radar signal. Furthermore, for feeding the excitation wave into the waveguide, a resonance pot can be dispensed with, which is frequently used in waveguide coupling devices and is often incorporated in a printed circuit board substrate. On the one hand, this can reduce manufacturing costs and, on the other, installation space. In particular, the tolerances in the manufacture of the resonant pot no longer have an effect on the radar signal, or at least have a smaller effect.

According to an embodiment, the first excitation element and the second excitation element of the waveguide coupling device each protrude at least partially from a wall and/or inner surface of the waveguide into the inner volume of the waveguide. In other words, the excitation elements may be disposed adjacent to and/or contiguous with the wall of the waveguide. For example, the first and second excitation elements may be in contact with the wall and/or inner surface of the waveguide.

According to an embodiment, the first excitation element and the second excitation element protrude from the wall and/or inner surface of the waveguide at two opposite sides and/or at two different sides of the waveguide of the waveguide, for example towards a center of the waveguide. For example, the first and second excitation elements, and optionally one or more further excitation elements, may protrude from the wall and/or inner surface of the waveguide along an inner circumference of the waveguide at different positions, regions, and/or sides of the waveguide.

According to an embodiment, at least the first length of the first excitation element and the second length of the second excitation element are matched to each other in such a way that the second resonant wave can be generated with a time delay relative to the first resonant wave in such a way that the first resonant wave and the second resonant wave can be superimposed, for example at least partially in phase and/or constructively interfered. For example, the excitation wave can enter the waveguide from the radiation region, and initially the first resonant wave can be generated by at least one or both excitation elements. As the excitation wave and/or the first resonance wave progresses in the waveguide, the second resonance wave can further be generated with a time delay, by at least one or both excitation elements, which can interfere or add up with the first resonance wave progressing in the waveguide. This can enable the provision of a broadband radar signal.

According to an embodiment, the first resonant wave arises at the second excitation element and/or through the second excitation element. Alternatively or additionally, the second resonant wave is formed between the first and second excitation elements. For example, the second resonant wave may be formed between the top edges of the first and second excitation elements.

According to an embodiment, the waveguide of the waveguide coupling device is formed integrally with the first and with the second excitation element. The waveguide together with the excitation elements can be manufactured, for example, in a casting process and/or die casting process, or 3D printing in metal or in plastic with subsequent metallization. This can in particular increase a mechanical stability of the waveguide as well as enable a precise formation of the excitation elements. Alternatively, however, at least some of the excitation elements can be welded to the waveguide, glued, or otherwise connected to the waveguide.

According to an embodiment, the waveguide coupling device further comprises a third excitation element arranged at the excitation end in the inner volume of the waveguide. The third excitation element has a third length dimensioned in the longitudinal direction of the waveguide, which is different from the first length of the first excitation element and the second length of the second excitation element. The third length is dimensioned such that a third resonant wave with a third resonant frequency, which differs from the first and second resonant frequencies, can be excited via the excitation wave between the first excitation element and the third excitation element. Optionally, one or more further excitation elements may also be provided. All of the foregoing and subsequent disclosure regarding one of the excitation elements applies equally to any other excitation element, unless explicitly described otherwise. The third resonant wave can advantageously further increase the broadband capability.

According to an embodiment, the first resonance wave, the second resonance wave, and the third resonance wave can be superimposed on the radar signal. In other words, the three resonance waves can interfere, in particular at least partially interfere in phase. As explained above with respect to the first and second excitation elements and the first and second resonant waves, the third length of the third excitation element may be selected and/or coordinated with the first and second lengths such that the third resonant wave is generated with a time delay with respect to the first and second resonant waves and may add to the wave(s) as they progress inside the waveguide. In this way, a broadband radar signal can be generated based on the first, second, and third resonant waves, which may include, but is not limited to, the first, second, and third resonant frequencies. Signals of the same frequency can amplify when superimposed, whereas signals of different frequencies can cause a certain frequency offset when superimposed and thus a certain broadbandness of the radar signal.

According to an embodiment, the third excitation element is formed as a wall projection. The third excitation element can also be referred to as a wall or an edge of the wall projection. In particular, this can enable a compact design of the waveguide and increase a mechanical stability.

According to an embodiment, the second exciter element projects into the inner volume from the wall projection formed by the third exciter element. In this case, it is conceivable that the second and third exciter elements can be formed in one piece.

According to an embodiment, the first length is greater than the second length and the third length is greater than the first length. Other relative length ratios of the lengths of the excitation elements are also conceivable and can be used.

For example, the lengths and/or length ratios may be selected depending on the desired frequency band of the radar signal and/or depending on the desired resonance frequencies.

Optionally, other parameters such as the geometries, shapes, sizes, orientation to each other and/or the relative arrangement of the excitation elements to each other can also be selected and/or matched depending on the desired frequency band.

According to an embodiment, the high-frequency substrate has a rectangular cross-section at least in a partial area. This can enable a compact design of the substrate-integrated waveguide as well as an efficient conduction of the excitation wave(s).

According to an embodiment, the waveguide of the waveguide coupling device is a round waveguide. The waveguide may thus have a round cross-section and/or a round cross-section geometry. However, other geometries are conceivable.

For example, the substrate-integrated waveguide can have a rectangular cross-section and the waveguide can be designed as a round waveguide. The design of the waveguide coupling device according to embodiments with radiation area and the at least two excitation elements allows in an advantageous way to create a transition for the excitation wave from such a rectangular substrate-integrated waveguide into the round waveguide without the need for a further module for conversion from rectangular to round waveguide.

According to an embodiment, the high-frequency substrate has an upper copper layer and a lower copper layer, which are at least partially connected with vias. The upper copper layer and the lower copper layer may also be referred to as the top side and the bottom side. The substrate-integrated waveguide may be formed between the two copper layers. The vias may electrically conductively connect the two copper layers. The vias may form and/or define a boundary of the substrate-integrated waveguide, as it were.

According to an embodiment, the radiation area of the high-frequency substrate is limited by vias. The vias limiting the radiation area can be considered as "sidewalls" of the radiation area and are often also called vias.

Another aspect of the present disclosure relates to a radar sensor having a waveguide coupling device as described above and below. The radar sensor may be of any type. It may be a level radar sensor, a distance sensor, a boundary level sensor, a motion radar sensor, a weather radar sensor, or a ground radar sensor. For example, the radar sensor may have one or more antennas, such as a horn antenna. The radar sensor may further generally be a field device for sensing one or more measurands.

Sometimes it can be provided that radar sensors generate a transmit signal or radar signal which covers a certain frequency range. In level measurement technology, for example, the transmission frequency can be raised over a certain frequency range during a measurement cycle, which is also referred to as Frequency Modulated Continuous Wave Radar. By providing a broadband radar signal via the waveguide coupling device, such a frequency lift can be implemented or enabled.

Another aspect of the present disclosure relates to a level measurement device comprising a radar sensor and/or a waveguide coupling device, as described above and below. The level measurement device may be configured to detect a level of a medium, such as a medium in a container.

Another aspect of the present disclosure relates to the use of a waveguide coupling device in a radar sensor and/or a level meter, as described above and below.

Another aspect of the present disclosure relates to a method of generating and/or receiving a radar signal using a waveguide coupling device as described above and below. The method comprises the following steps Feeding at least one excitation wave into a high-frequency substrate of a waveguide coupling device;

Coupling the excitation wave into an excitation end of a waveguide of the waveguide coupling device via a radiation region of the high-frequency substrate of the waveguide coupling device;

exciting, via the excitation wave at and/or based on at least a first excitation element and a second excitation element of the waveguide, at least a first resonant wave having a first resonant frequency and a second resonant wave having a second resonant frequency; and radiating the radar signal with the waveguide of the waveguide coupling device based on a superposition of at least the first resonant wave and the second resonant wave; and/or receiving a reflected radar signal with the waveguide of the waveguide coupling device.

Exemplary embodiments are described below with reference to the figures. The illustrations in the figures are schematic and not to scale. If the same or similar reference signs are used in the following description of the figures, these designate the same or similar elements.

BRIEF DESCRIPTION OF THE DRAWINGS/FIGURES

The accompanying drawings, which are incorporated herein and form part of the specification, illustrate embodiments and, together with the description, further serve to explain the principles of the aspects and to enable a person skilled in the relevant art(s) to make and use the embodiments.

DETAILED DESCRIPTION

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same aspect. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Figure 1:
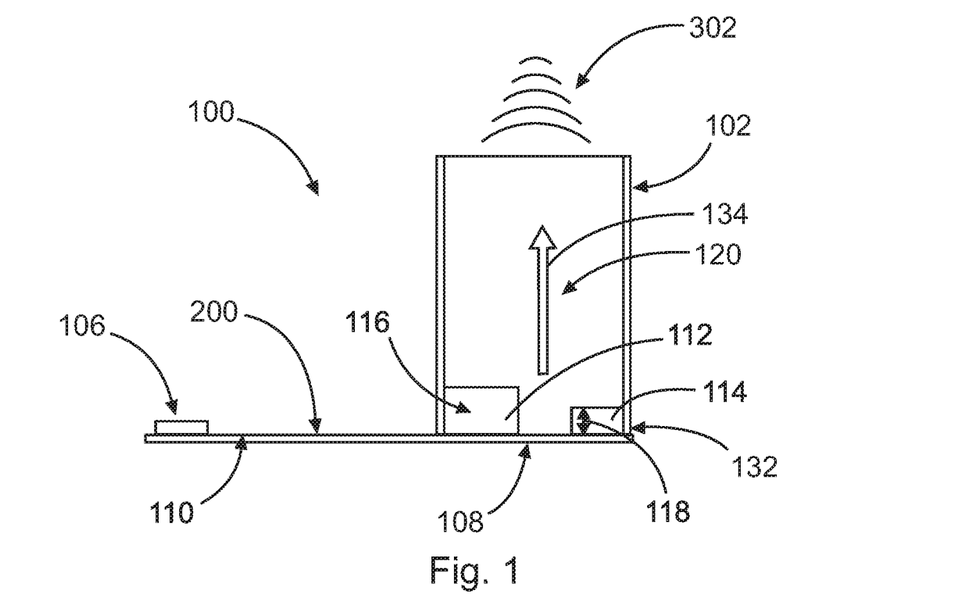
FIG. 1 shows a waveguide coupling device according to an embodiment.

FIG. 1 shows a waveguide coupling device 100 according to an embodiment.

The waveguide coupling device 100 includes a high-frequency substrate 200 having an input conductor 106 disposed at a first end of the high-frequency substrate 200. It may be provided that the input conductor is not raised relative to the substrate. One or more excitation waves may be input to the high frequency substrate 200 via the input conductor, such as from a radar module. This first end is located in the direction of propagation of the excitation wave, in the direction of travel of the excitation wave, and/or in the longitudinal direction of the high-frequency substrate 200 opposite a second end of the high-frequency substrate 200 at which a radiating region 108 of the high-frequency substrate 200 is arranged. The input conductor 106 and the radiating region 108 are in turn coupled by a substrate-integrated waveguide 110, through which the excitation wave can travel from the input conductor 106 to the radiating region 108.

The waveguide coupling device 100 further includes a waveguide 102 having an excitation end 132 disposed at, on, and/or above the radiation region 108 of the high-frequency substrate 200. The excitation wave can be at least partially coupled into an interior volume 120 of the waveguide 102 via the radiating region 108.

At least a first excitation element 112 and a second excitation element 114 are disposed in the region of the excitation end 132 of the waveguide 102. Each excitation element 112, 114 has a length 116, 118 dimensioned in the longitudinal extension direction 134 of the waveguide 102. The lengths 116, 118 of the excitation elements 112, 114 are each dimensioned from a lower edge of the corresponding excitation element 112, 114 to an upper edge thereof. In the example shown in FIG. 1, the lower edges of the excitation elements 112, 114 are flush with the end face of the waveguide 102 at the excitation end 132. However, the excitation elements 112, 114 could also be arranged offset from each other in the longitudinal direction 134.

At least two resonant waves of different resonant frequencies may be generated by the excitation wave based on the excitation elements 112, 114. For example, a first resonant wave may be formed at one of the excitation elements 112, 114 and a second resonant wave may be formed between the two excitation elements 112, 114, for example between their top edges. Alternatively or additionally, one of the resonant waves may be formed at one of the excitation elements 112, 114 and another structure of the waveguide 102 and/or another excitation element. In particular, the lengths 116, 118 of the two excitation elements 112, 114 may be coordinated such that the resonant waves overlap, for example at least partially in phase and/or with substantially identical phase (and/or some phase offset from each other) as the wave(s) progress in the waveguide 102 to form at least a portion of the radar signal. Thus, a desirable broadband nature of the radar signal 302 may be achieved. For example, the broadband nature of the signal may be in a range of 1-50 GHz, particularly around 10 GHz at a frequency of 80 GHz.

With this type of coupling, bandwidths of more than 10%, for example 12-15%, about 12-13%, can be achieved.

Figure 6:
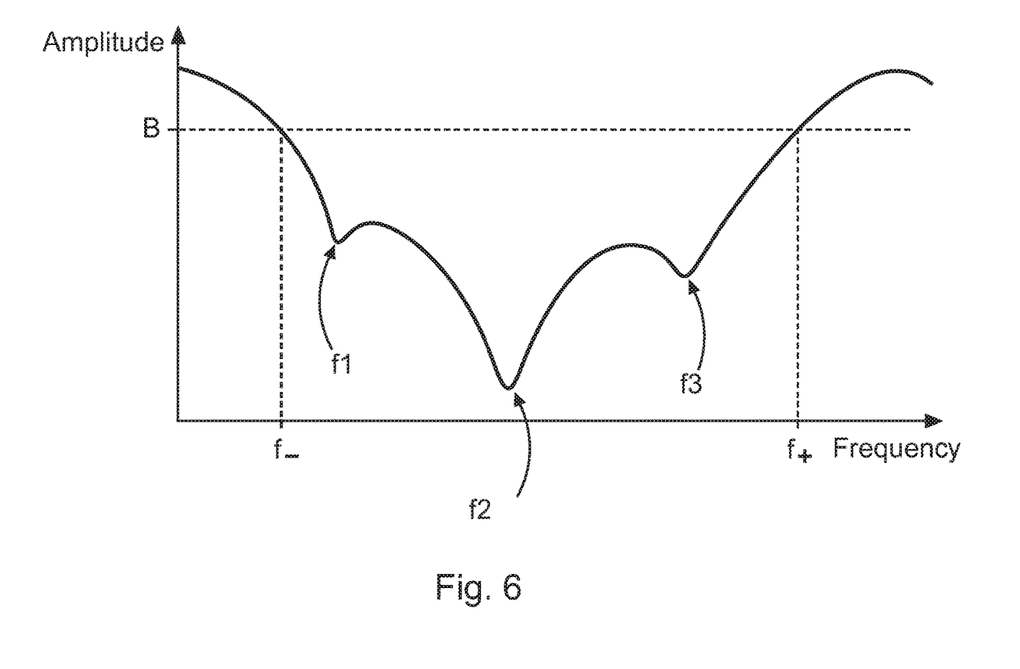
FIG. 6 shows a curve measured in a waveguide coupling device according to an embodiment.

Basically, two different types of superposition can be distinguished. On the one hand, a phase-correct superposition can occur with signals of the same frequency. With different frequencies, the phases inevitably diverge somewhat. Signals with different frequencies can, however, be superimposed on each other and, due to the frequency offset from one frequency to the other, form a certain broadband effect, for example as can be seen in FIG. 6. By superimposing two exciters or signals with the same frequency in phase, they can amplify each other. This increases the efficiency of the entire device. This effect can be exploited, for example, between the two exciters 112 and 122. Furthermore, due to the spatial distance and the propagation time of the signal, the phase can be adjusted, influenced, and/or adapted accordingly.

The two excitation elements 112, 114 of the embodiment of FIG. 1 are rectangular and/or fin-shaped. The waveguide 102 is further exemplarily formed as a circular waveguide 102, but may also be formed as a rectangular waveguide, for example. The excitation elements 112, 114 are spaced apart from each other in the radial direction of the waveguide 102. The two excitation elements 112, 114 thereby protrude from the wall and/or inner surface of the waveguide 102 on opposite sides.

The excitation elements 112, 114 of the waveguide 102 may also be considered a fin or dual fin, respectively. The first excitation element 112 may also be referred to as an exciter or resonator, and the second excitation element 114 may correspondingly be referred to as a sub-exciter or sub-resonator, or vice versa.

Optionally to the tuning of the lengths 116, 118, a geometry, size, shape, position, relative arrangement, and/or relative orientation of the excitation elements 112, 114 may also be adapted and/or tuned to each other to affect the resonant waves and/or resonant frequencies. Also, one or more additional excitation elements may be provided.

Figure 2:
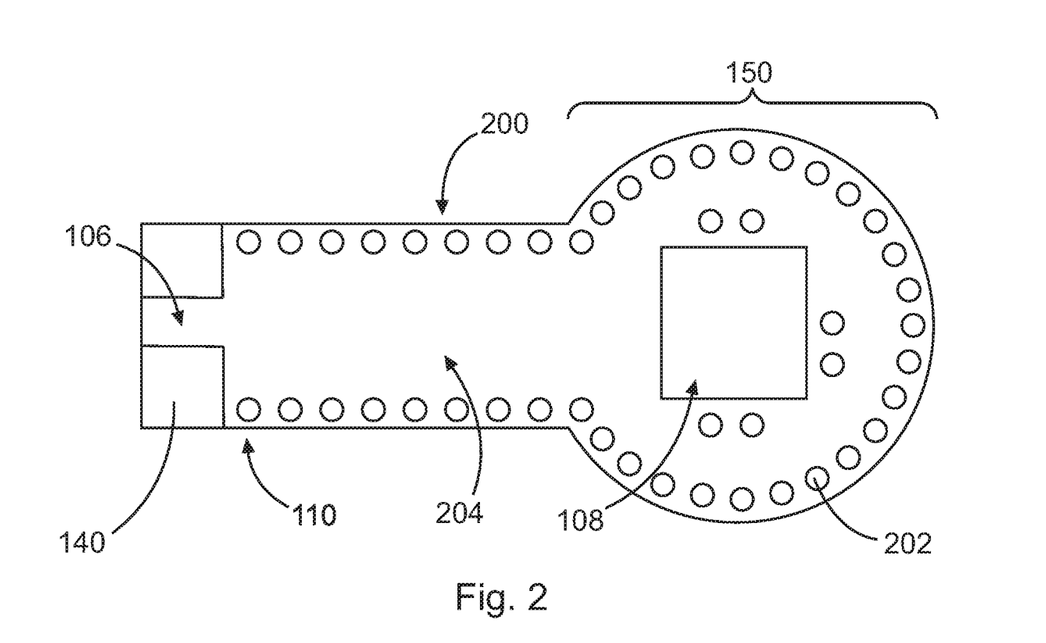
FIG. 2 shows a high-frequency substrate in a plan view according to an embodiment.

FIG. 2 shows a high frequency substrate 200 in a plan view according to an embodiment. The high frequency substrate 200 has an input conductor 106 for feeding an incoming excitation wave. The high-frequency substrate 200 has a rectangular cross-section and includes a substrate-integrated waveguide 110. The substrate-integrated waveguide 110 is formed between an upper copper layer 204a and a lower copper layer (not shown). Dielectric material may be formed between the copper layers 204a, 204b. Thus, the substrate integrated waveguide 110 resembles a filled waveguide. The two layers are connected by vias 202.

The upper copper layer 204a has an opening in the area of the radiation region 108, so that the excitation wave can emerge into the waveguide 102. The radiation region 108 is also delineated or outlined with vias 202.

The waveguide 102 may be positioned on the round portion 150 of the high-frequency substrate 200 of the FIG. 2 embodiment, with the end face of the waveguide 102 facing and/or disposed on the upper copper layer 204a so that the radiation region 108 is circled and/or enclosed by the waveguide 102 along the outer periphery thereof.

The substrate-integrated waveguide 110 includes vias 202 that form a wall. The vias 202 may alternatively or additionally delineate the radiation area 108. The vias 202 electrically connect the upper copper layer 204a and the lower copper layer 204b (not shown in FIG. 2, see FIG. 3).

Figure 3:
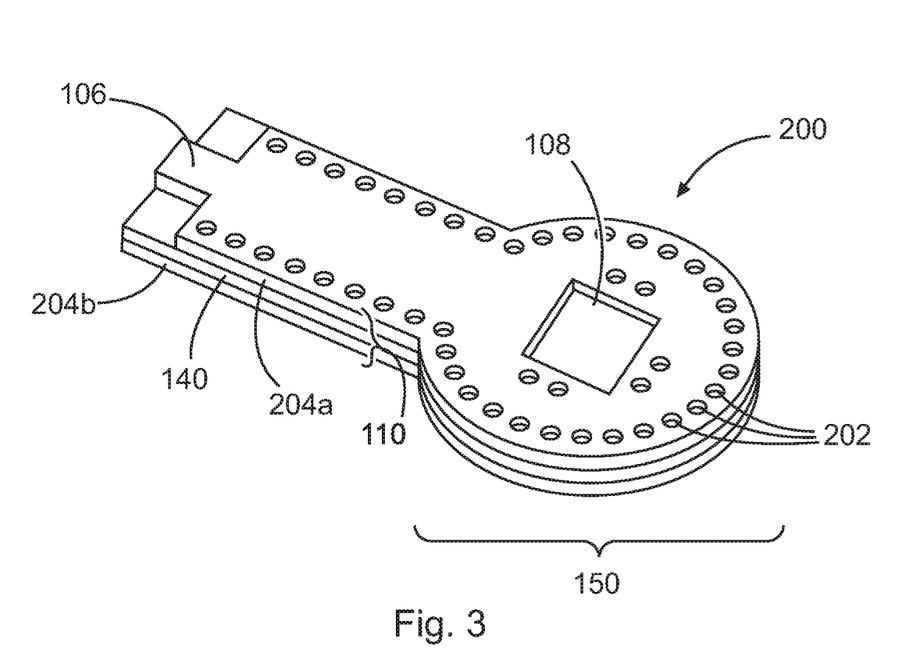
FIG. 3 shows a perspective view of the high-frequency substrate according to an embodiment.

FIG. 3 shows a perspective view of the high frequency substrate 200 According to an embodiment. Unless otherwise described, the high frequency substrate 200 of FIG. 3 has the same elements and/or components as the high frequency substrate 200 of FIG. 2. In FIG. 3, the three layers of the high frequency substrate 200 are clearly visible. The upper copper layer 204a is disposed on a substrate layer 140, which in turn is disposed on the lower copper layer 204b. The two copper layers 204a, 204b or copper layers are connected to each other by means of the vias 202. The breakdown in the upper copper layer 204a in the radiation region 108 is clearly visible in the example of the embodiment of FIG. 3.

Figure 4A:
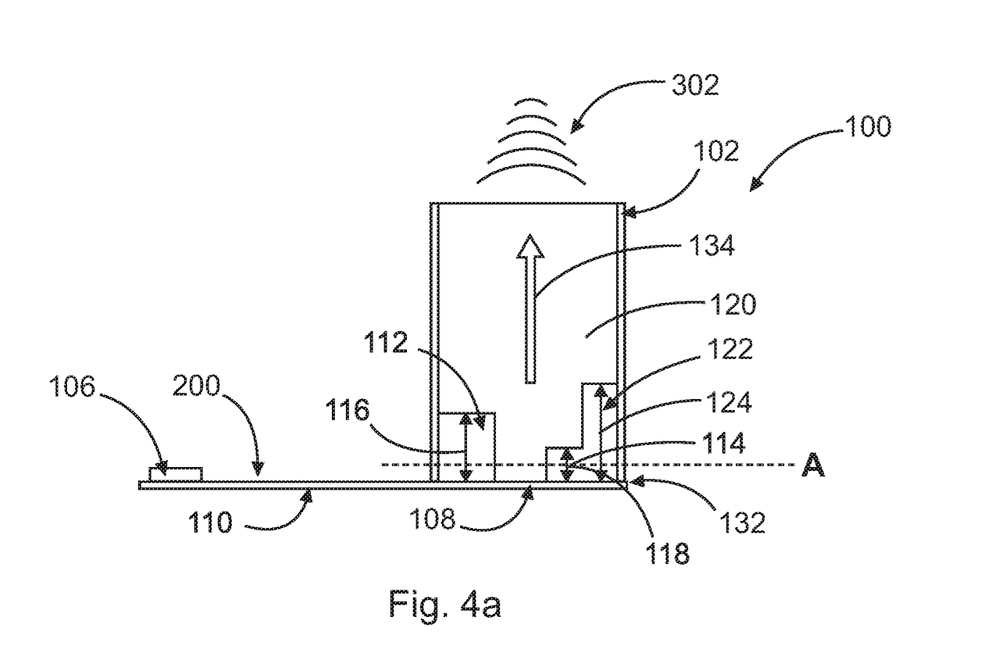
FIGS. 4a, 4b, and 4c show a waveguide coupling device according to an embodiment in three different views.

FIG. 4a shows a waveguide coupling device 100 according to a further embodiment. Unless otherwise described, the waveguide coupling device 100 of FIG. 4a has the same elements and/or components as the waveguide coupling device 100 of the preceding figures. The waveguide 102 of the embodiment of FIG. 4a is a circular waveguide 102. The waveguide 102 of the embodiment of FIG. 4a further comprises a third excitation element 122. This third excitation element 122 is formed as a wall protrusion and projects from the wall or inner surface of the waveguide 102 into the interior volume 120. The third excitation element 122 may also be considered part of the wall of the waveguide 102. The second excitation element 114 thereby protrudes from the third excitation element 122 into the interior volume 120. The length 124 of the third excitation element 122, as measured in the lengthwise direction 134, is greater than that of the first excitation element 116, which in turn is greater than that of the second excitation element 118. The height 124 of the third excitation element 122 is tuned such that a third resonant wave is excited with a slight time delay with respect to the first and second resonant waves. In particular, the third resonant wave can be excited between the first excitation element 112 and the third excitation element 122 (or between their top edges), which has a third resonant frequency different from the first and second resonant frequencies. Superposition of the three resonant waves forms the radar signal 302, which then propagates toward the output of the waveguide 102 and can be radiated via an end opposite the excitation end 132.

Figure 4B:
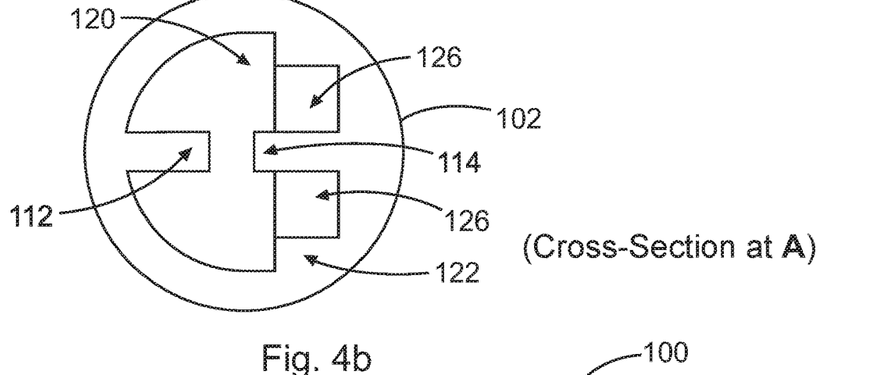

FIG. 4b shows a sectional view of the waveguide coupling device 100 of the embodiment of FIG. 4a along the line A of FIG. 4a. The perspective of the sectional view of FIG. 4b is along the direction of radiation of the radar signal and/or longitudinal direction 134 of extension of the waveguide 102. The waveguide 102 of FIG. 4b further has two cavities 126 located from either side of the second excitation element 114. The cavities 126 may serve to improve the manufacturability of the waveguide 102. Referring to FIG. 4b, the waveguide 102 of FIGS. 4a and 4b is integrally formed with the three excitation elements 114, 116, 122.

Figure 4C:
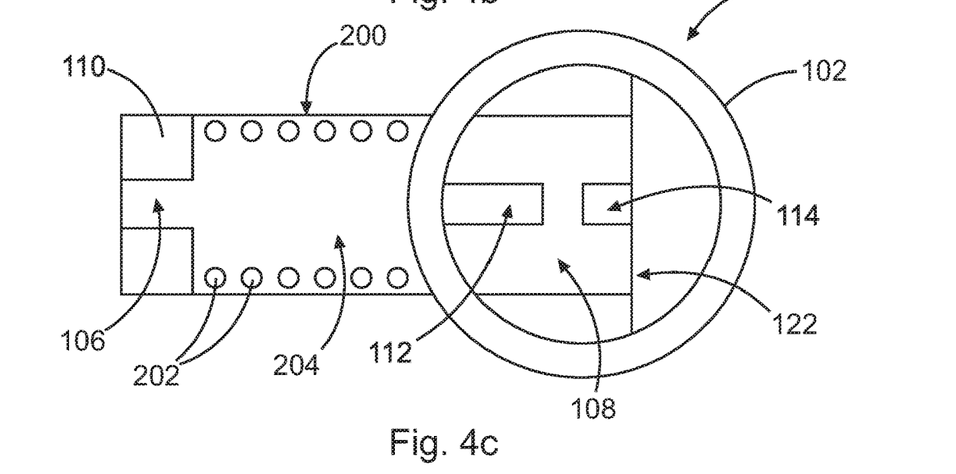

FIG. 4c shows a top view of the waveguide coupling device 100 According to an embodiment. FIG. 4c shows how the radiating region 108 is annularly enclosed by the waveguide 102, allowing the excitation wave to enter the internal volume of the waveguide 102.

Figure 5:
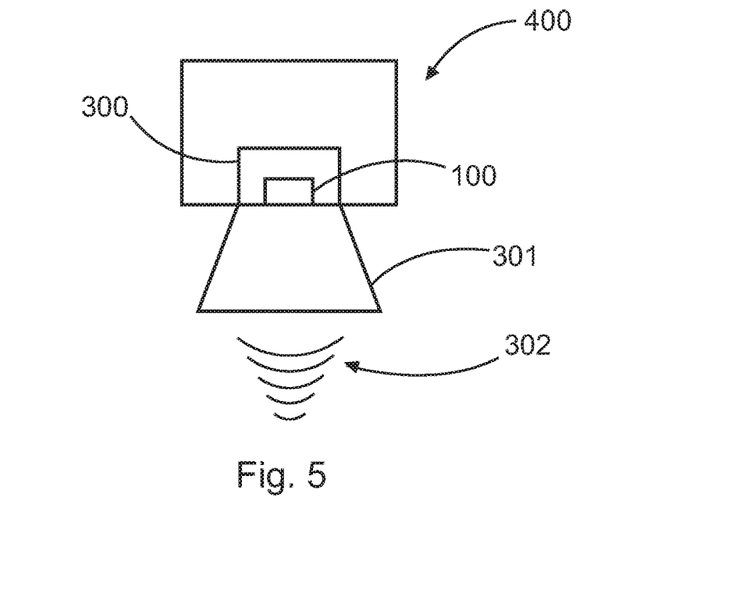
FIG. 5 shows a level meter and/or a radar sensor according to an embodiment.

FIG. 5 shows a level meter 400 and/or a radar sensor 400 According to an embodiment. The level meter 400 of the embodiment of FIG. 5 comprises a radar module 300 and a waveguide coupling device 100. An excitation wave can be fed into the waveguide coupling device 100 via the radar module 300 and radiated, for example, via an antenna 301.

FIG. 6 shows a curve measured in a waveguide coupling device 100 According to an embodiment. In particular, the curve shown in FIG. 6 is a return loss curve, which is shown as a function of frequency. The curve is shown in FIG. 6 by means of a diagram. The vertical axis of the diagram shows the amplitude of the returnloss curve in any unit. For example, the amplitude can be expressed in dB. The horizontal axis shows a frequency in an arbitrary unit. For example, the frequency can be expressed in GHz or MHz. The measured curve of FIG. 6 may have been obtained by superimposing and/or adding three resonant waves. In the diagram of FIG. 6 three resonance frequencies f1, f2, f3 are recognizable. The first resonance wave, which can be formed at one of the excitation elements 112, 114 (see FIG. 1 or 4a), can have the resonance frequency f1. The second resonance wave, which can be formed between the two excitation elements 112, 114, for example between their upper edges, can have the resonance frequency f2. The third resonance wave, which can be excited between the first excitation element 112 and the third excitation element 122 (or between their upper edges) (see FIG. 4a), can have the resonance frequency f3. The three resonance frequencies f1, f2, f3 are different from each other.

Also recognizable in the diagram of FIG. 6 is a possible bandwidth of the measured curve achieved by the design of the waveguide coupling device, in particular the excitation elements 112, 114, 122. The bandwidth of the radar signal 302 achieved by the design of the waveguide coupling device, in particular the excitation elements 112, 114, 122 (see FIGS. 1, 4a and 5) can be directly or indirectly related to the bandwidth of the measured curve. This may, for example, denote a frequency range of the measured curve in which the measured curve is without interruption below a predetermined amplitude value B. The value B can be −10 dB, for example. However, other values for B are conceivable. In the example of FIG. 6, this frequency range is between the frequencies f− and f+.

Figure 7:
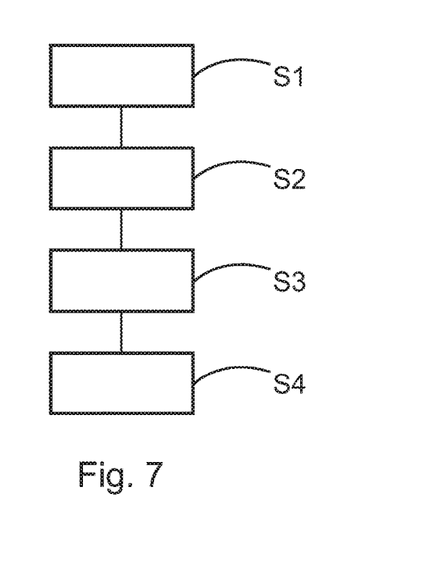
FIG. 7 shows a flowchart illustrating steps of a method for generating a radar signal with a waveguide coupling device according to an embodiment.

FIG. 7 shows a flow chart illustrating a process According to an embodiment.

In step S1, at least one excitation wave is injected into a high-frequency substrate 200 of a waveguide coupling device 100.

In step S2, the excitation wave is coupled into an excitation end 132 of a waveguide 102 of the waveguide coupling device 100 via a radiation region 108 of the high-frequency substrate 200 of the waveguide coupling device 100, and in step S3, at least a first resonant wave having a first resonant frequency and a second resonant wave having a second resonant frequency are excited via the excitation wave on at least a first excitation element and a second excitation element 112, 114 of the waveguide 102.

In step S4, the radar signal 302 is radiated using the waveguide 102 of the waveguide coupling device 100 based on a superposition of at least the first resonant wave and the second resonant wave.

It should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

What is claimed is:

1. A waveguide coupling device for a radar sensor, comprising:
   a waveguide configured to emit or receive a radar signal; and
   a high-frequency substrate comprising:
      a first end at which an input conductor configured to feed an excitation wave into the high-frequency substrate is disposed; and
      a second end at which a radiation region is disposed to couple the excitation wave out of the high-frequency substrate, the second end being opposite the first end,
      wherein the waveguide is coupled to the input conductor and the radiation region,
   wherein the waveguide comprises an excitation end on the radiation region of the high-frequency substrate,
   wherein the excitation wave is coupled into the excitation end of the waveguide via the radiation region of the high-frequency substrate,
   wherein the waveguide comprises a first excitation element and a second excitation element, each of which is disposed at the excitation end in an interior volume of the waveguide,
   wherein the first excitation element has a first length measured in the longitudinal direction of the waveguide and the second excitation element has a second length dimensioned in the longitudinal direction of the waveguide, which is different from the first length of the first excitation element, so that a first resonant wave with a first resonant frequency and a second resonant wave with a second resonant frequency are excited via the excitation wave at the first excitation element and the second excitation element,
   wherein the first length of the first excitation element and the second length of the second excitation element are matched to one another in such a way that the second resonant wave can be is generated with a time delay with respect to the first resonant wave in such a way that the first resonant wave and the second resonant wave is superimposed at least partially in phase, and
   wherein the waveguide is configured to superimpose the first resonant wave and the second resonant wave to form the radar signal.

2. The waveguide coupling device of claim 1, wherein each of the first excitation element and the second excitation element projects at least partially from a wall of the waveguide into the interior volume of the waveguide.

3. The waveguide coupling device of claim 1, wherein the first excitation element and the second excitation element project from a wall of the waveguide on two opposing sides of the waveguide.

4. The waveguide coupling device of claim 1, wherein the first resonant wave originates at the second excitation element and the second resonant wave originates between the first and second excitation elements.

5. The waveguide coupling device of claim 1, wherein the waveguide of the waveguide coupling device is integrally formed with the first and with the second excitation element.

6. The waveguide coupling device of claim 1, further comprising:
   a third excitation element disposed at the excitation end in the interior volume of the waveguide,
   wherein the third excitation element has a third length measured in the longitudinal direction of the waveguide, which is different from the first length of the first excitation element and the second length of the second excitation element, and
   wherein the third length is dimensioned such that a third resonant wave with a third resonant frequency is excited via the excitation wave between the first excitation element and the third excitation element.

7. The waveguide coupling device of claim 6, wherein the waveguide is configured to superimpose the first resonant wave, the second resonant wave, and the third resonant wave to the radar signal.

8. The waveguide coupling device of claim 6, wherein the second excitation element is configured to project into the interior volume of the waveguide from a wall projection formed by the third excitation element.

9. The waveguide coupling device of claim 6, wherein the first length is greater than the second length and the third length is greater than the first length.

10. The waveguide coupling device of claim 1, wherein the high-frequency substrate has a rectangular cross-section at least in a partial area.

11. The waveguide coupling device of claim 1, wherein the waveguide of the waveguide coupling device is a circular waveguide.

12. A radar sensor comprising the waveguide coupling device according to claim 1.

13. A level meter comprising the waveguide coupling device according to claim 1.

14. A method of using the waveguide coupling device of claim 1 in a radar sensor.

15. A method of using the waveguide coupling device of claim 1 in a level meter.

16. A waveguide coupling device for a radar sensor, comprising:
   a waveguide configured to emit or receive a radar signal; and
   a high-frequency substrate comprising:
      a first end at which an input conductor configured to feed an excitation wave into the high-frequency substrate is disposed; and
      a second end at which a radiation region is disposed to couple the excitation wave out of the high-frequency substrate, the second end being opposite the first end,
      wherein the waveguide is coupled to the input conductor and the radiation region,
   wherein the waveguide comprises an excitation end on the radiation region of the high-frequency substrate,
   wherein the excitation wave is coupled into the excitation end of the waveguide via the radiation region of the high-frequency substrate,
   wherein the waveguide comprises a first excitation element, a second excitation element, and a third excitation, each of which is disposed at the excitation end in an interior volume of the waveguide,
   wherein the first excitation element has a first length measured in the longitudinal direction of the waveguide, and the second excitation element has a second length dimensioned in the longitudinal direction of the waveguide, which is different from the first length of the first excitation element, so that a first resonant wave with a first resonant frequency and a second resonant wave with a second resonant frequency are excited via the excitation wave at the first excitation element and the second excitation element,
   wherein the third excitation element has a third length dimensioned in the longitudinal direction of the waveguide, which is different from the first length of the first excitation element and the second length of the second excitation element, so such that a third resonant wave with a third resonant frequency is excited via the excitation wave between the first excitation element and the third excitation element, and
   wherein the waveguide is configured to superimpose the first resonant wave and the second resonant wave to form the radar signal.

17. The waveguide coupling device of claim 16, wherein the first length of the first excitation element and the second length of the second excitation element are matched to one another in such a way that the second resonant wave can be is generated with a time delay with respect to the first resonant wave in such a way that the first resonant wave and the second resonant wave is superimposed at least partially in phase.

18. The waveguide coupling device of claim 16, wherein the waveguide is configured to superimpose the first resonant wave, the second resonant wave, and the third resonant wave to the radar signal.

19. The waveguide coupling device of claim 16, wherein the second excitation element is configured to project into the interior volume of the waveguide from a wall projection formed by the third excitation element.

20. The waveguide coupling device of claim 16, wherein the first length is greater than the second length, and the third length is greater than the first length.

* * * * *